US012762673B2

(12) United States Patent
Chandrasekhar et al.

(10) Patent No.: US 12,762,673 B2
(45) Date of Patent: Oct. 13, 2026

(54) FISHEYE LENS STRUCTURE, HOUSING, IMAGE CAPTURE, AND IMAGE PROCESSING

(71) Applicant: Baller, Inc., Pasadena, CA (US)

(72) Inventors: Akshay Chandrasekhar, Los Angeles, CA (US); Aaron Francis Hawkey, Pasadena, CA (US); Brian James Vernarsky, San Francisco, CA (US); Paul Georg Kefer, Pasadena, CA (US); Abate De Mey, Alhambra, CA (US); Kavodel Ohiomoba, New York, NY (US)

(73) Assignee: Baller, Inc., Pasadena, CA (US)

( * ) Notice: Subject to any disclaimer, the term of this patent is extended or adjusted under 35 U.S.C. 154(b) by 303 days.

(21) Appl. No.: 18/444,532

(22) Filed: Feb. 16, 2024

(65) Prior Publication Data

US 2025/0265689 A1 Aug. 21, 2025

(51) Int. Cl.

*G06T 5/80* (2024.01)
*G06T 3/06* (2024.01)
*G06T 3/40* (2024.01)
*G06T 3/60* (2024.01)

(52) U.S. Cl.

CPC .................. *G06T 5/80* (2024.01); *G06T 3/06* (2024.01); *G06T 3/40* (2013.01); *G06T 3/60* (2013.01)

(58) Field of Classification Search

CPC .... G06T 5/80; G06T 3/06; G06T 3/40; G06T 3/60

See application file for complete search history.

(56) References Cited

U.S. PATENT DOCUMENTS

| | | | | |
|---|---|---|---|---|
| 10,798,300 | B2 * | 10/2020 | Wang | G06T 3/047 |
| 2005/0058360 | A1 * | 3/2005 | Berkey | H04N 5/2628 348/E7.086 |
| 2007/0263093 | A1 * | 11/2007 | Acree | H04N 7/181 348/E7.086 |

(Continued)

FOREIGN PATENT DOCUMENTS

WO WO 2009/068942 A1 6/2009

OTHER PUBLICATIONS

Patent Cooperation Treaty, International Search Report and Written Opinion, PCT Application No. PCT/US2025/013629, Jun. 3, 2025, 24 pages.

*Primary Examiner* — Ming Shui
(74) *Attorney, Agent, or Firm* — Fenwick & West LLP

(57) ABSTRACT

An image capture device accesses two-dimensional input image comprising pixels distorted in a radial direction. The image capture device defines a projection of a region within the image corresponding to a set of control signals mimicking adjustments to a field of view of the camera, The projection is a two-dimensional coordinate plane of the region without distortions in the radial direction. The image capture device normalizes each point on the projection onto a three-dimensional coordinate sphere representing a full range of motion of the camera. The image capture device maps each normalized point on the coordinate sphere to a two-dimensional point on the input image. For each mapped point on the input image, the image capture device extracts a pixel value from a pixel at the mapped point to project the pixel value at a corresponding position on the projection of the region.

18 Claims, 10 Drawing Sheets

400

405

(56) References Cited

U.S. PATENT DOCUMENTS

| | | | | |
|---|---|---|---|---|
| 2019/0012766 | A1* | 1/2019 | Yoshimi | G02B 13/06 |
| 2019/0058828 | A1 | 2/2019 | Russi-Vigoya et al. | |
| 2019/0102868 | A1* | 4/2019 | Beric | H04N 25/61 |
| 2019/0130540 | A1* | 5/2019 | Ding | B60R 1/27 |
| 2021/0012454 | A1* | 1/2021 | Tezaur | G06T 3/60 |
| 2021/0035307 | A1* | 2/2021 | Shih | G06V 40/165 |
| 2021/0173167 | A1 | 6/2021 | Cotoros et al. | |
| 2022/0366547 | A1 | 11/2022 | Powell | |
| 2023/0305366 | A1 | 9/2023 | Zhao et al. | |

* cited by examiner

400

450

600

800

850

FISHEYE LENS STRUCTURE, HOUSING, IMAGE CAPTURE, AND IMAGE PROCESSING

BACKGROUND

This disclosure relates generally to methods and devices for projecting an image without distortion and, more specifically, to transforming a visually distorted image into an image projection without distortion.

Mobile devices and other client devices are often integrated with a camera that includes a traditional pinhole lens. Such traditional lenses offer only a restricted field of view, which makes it difficult to capture images of expansive areas using the camera of the mobile device. Fisheye lenses offer a much wider field of view. As a result, a camera configured with a fisheye lens offers a wider field of view and may capture larger areas in a single image or frame compared to traditional, pinhole lenses. However, images captured using conventional fisheye lens are subject to various distortions that can be visually distracting to a user. For example, an image of a scene captured by a conventional fisheye lens may stretch the perceived distance between objects in a frame or distort the depth of objects in the frame compared to how the scene would have been perceived by the human eye.

SUMMARY

In one embodiment, the image capture device includes a camera that captures video frames of image data of a scene surrounding the camera. For example, the lens of the camera is a traditional pinhole lens with a narrow field of view. The image capture device further includes a lens attachment that directs light rays from the lens of the camera across a wider field of view than the lens of the camera. For example, the lens attachment is a fisheye lens with a wider field of view than the lens of the camera. The image capture device further includes a housing that removably couples the lens attachment to the camera. The housing secures the camera such that the lens attachment overlays the lens of the camera.

The image capture device also includes a processor communicatively coupled to the camera. The processor receives a video frame captured by the camera through the lens attachment. The video frame captured through the wider view lens attachment is captured in a three-dimensional coordinate space. The processor generates a two-dimensional projection of the video frame by mapping pixels of the video frame from the three-dimensional coordinate space to a two-dimensional coordinate space.

In one embodiment, the image capture device accesses an input image captured by a camera. The input image is a two-dimensional image comprising pixels distorted in a radial direction. The image capture device defines a projection of a region within the image corresponding to a set of control signals mimicking adjustments to a field of view of the camera. The projection is a two-dimensional coordinate plane of the region without distortions in the radial direction. The image capture device normalizes each point on the projection onto a three-dimensional coordinate sphere representing a full range of motion of the camera. The image capture device maps each normalized point on the coordinate sphere to a two-dimensional point on the input image. For each mapped point on the input image, the capture system extracts a pixel value from a pixel at the mapped point to project the pixel value at a corresponding position on the projection of the region.

BRIEF DESCRIPTION OF DRAWINGS

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict various embodiments for purposes of illustration only. One skilled in the art will readily recognize from the following description that alternative embodiments of the structures and methods illustrated herein may be employed without departing from the principles of the disclosure described herein.

DETAILED DESCRIPTION

System Environment for Image Processing Platform

Figure 1:
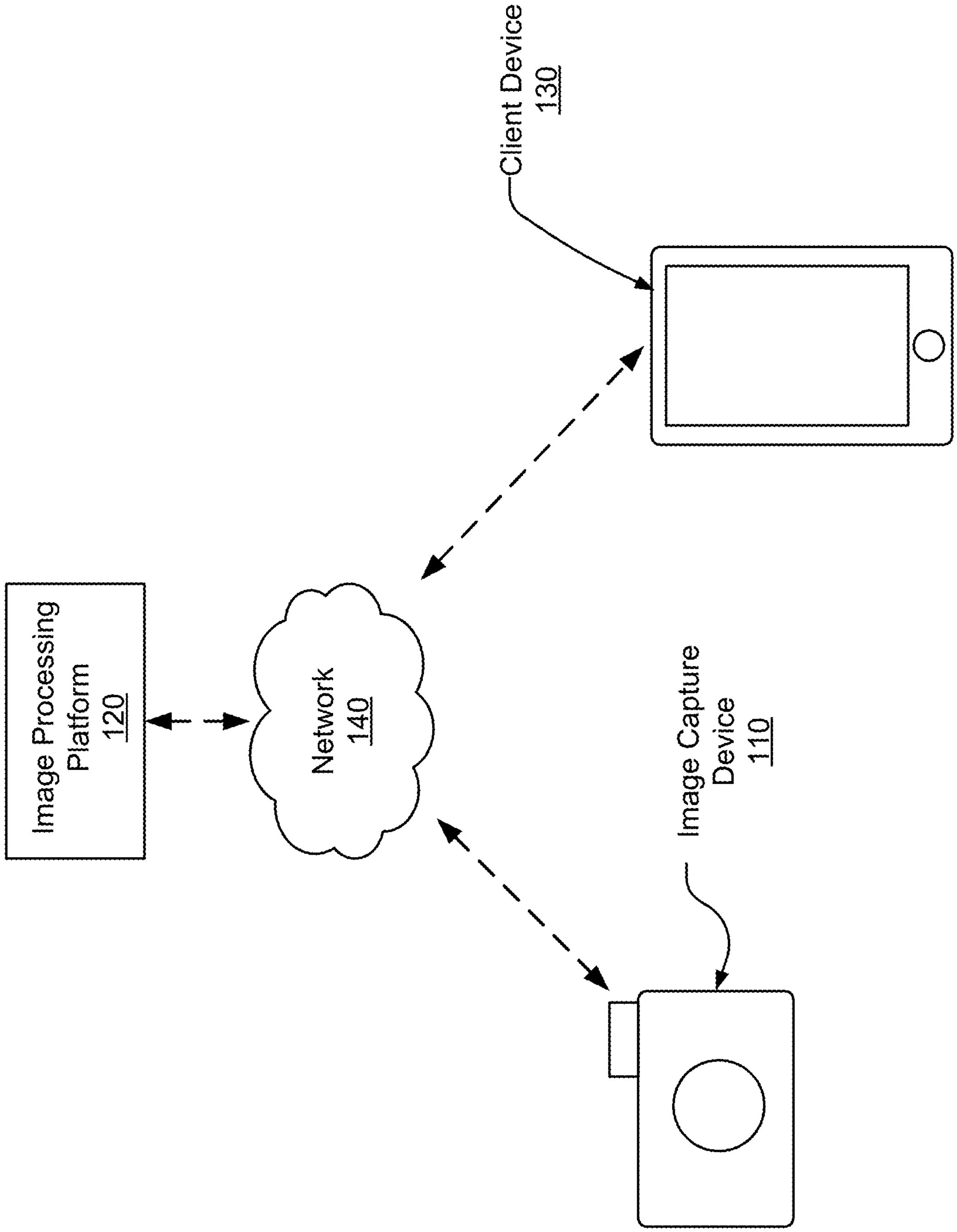
FIG. 1 illustrates an example system environment for image processing platform, according to one or more embodiments.

FIG. 1 illustrates an example system environment for an image processing platform 130, according to one or more embodiments. The system environment illustrated in FIG. 1 includes an image capture device 110, a client device 110, an image processing platform 130, and a network 140. Alternative embodiments may include more, fewer, or different components from those illustrated in FIG. 1, and the functionality of each component may be divided between the components differently from the description below. For example, functionality describes below as being performed by the image processing platform 130 may be performed by the client device 110. Similarly, function Additionally, each component may perform their respective functionalities in response to a request from a human, or automatically without human intervention.

The image capture device 110 captures imaging data of an area surrounding a user of the image capture device. The image capture device 110 may be one of various types of devices including, but not limited to, digital cameras, smart phones, tablets, drones, or any other suitable device configured to capture an image. The image capture device 110 may be equipped with various types of sensors to capture different types of image data, for example still photographs, video, infrared images, or three-dimensional (3D) images. Examples of such sensors include, but are not limited to, charge-coupled devices (CCDs) and complementary metal-oxide semiconductor (CMOS) sensors. The image capture device 110 typically includes one or more optical elements, for example lenses, image sensors, image signal processing sensors, encoders, or a combination thereof to capture and process image data. The optical elements of the image capture device 110 capture images by receiving and focusing light. The image capture device 110 further includes a controller that processes and transmits image data collected by the image capture device 110.

The image capture device 110 includes a camera configured to capture image and/or video data (e.g., video frames). In one embodiment, the image capture device is a mobile device, for example a mobile phone or a tablet, integrated with a camera configured to capture image and/or video data. Traditional pinhole lenses integrated into the cameras of a mobile device can only capture a limited field of view. For example, a user may position a mobile device at half-court of a basketball game to record the game, but the camera lens may only capture a limited field of view extending several feet in either direction of the camera and would not capture image data for parts of the court beyond the field of view of the lens. Conventionally, a user of the mobile device could manually adjust the field of view of the lens by repositioning or adjusting the orientation of the mobile device so that different parts of the scene surrounding the camera fell within the field of view.

A fisheye lens is a wide-angle camera lens that offers a wide field of view, capable of capturing an expansive scene with a hemispherical or circular perspective. For example, a fisheye lens captures a 180-degree field of view. In some embodiments, the image capture device 110 further includes a lens attachment that removably couples a fisheye lens to the camera of the image capture device 110. The lens attachment may be secured to a camera using any suitable securing mechanism, for example magnetic coupling or an adhesive coupling. When secured to the camera, the lens attachment overlays the lens of the camera such that the fisheye lens of the lens attachment directs light rays from the center of the lens of the camera to the edges of the lens attachment. In one embodiment, the image capture device 110 includes a mobile device with an integrated camera. The lens attachment of the image capture assembly is secured to the surface of the mobile device with the integrated camera such that the lens attachment overlays the camera lens. The lens attachment of the image capture device is further described below with reference to FIGS. 2 and 3A-F.

In some embodiments, the image capture device 110 includes a housing that secures the lens attachment. In one embodiment, for example the embodiment illustrated in FIG. 2, the housing removably secures the lens attachment in place when attached to the camera. In another embodiment, the lens attachment is integrated into a housing that encases the camera. In such embodiments, the camera may be removably inserted into the housing such that the integrated lens attachment overlays the camera lens. For example, a mobile device may be inserted into the housing such that the housing aligns the camera lens with the lens attachment and secures the mobile device in place during use.

The image capture device 110 transmits the captured images to the image processing platform 120 for further image processing. The image processing platform 120 performs various image processing techniques, for example applying filters, enhancing image quality, resizing images, compressing images, or adding metadata to the captured image data before transmitting the processed image data to the client device 130. In some embodiments, the image processing techniques applied by the image processing platform 120 may be performed locally or by a processor of the image capture device. In other embodiments, the image capture device 110 transmits the captured image data to the client device 130 for further image processing. The image processing platform 120 is further described below with reference to FIGS. 4-10.

The client device 130 is a computing device that displays image data captured by the image capture device 110 after processing by the image processing platform 120. Accordingly, a user can view image data collected by the image capture device 110 and processed by the image processing platform 120 via the client device 130. In some embodiments, the client device 130 and the image capture device 110 are the same computing device. In other embodiments, the client device 130 and the image capture device 110 are different computing devices. The client device 130 can be a personal or mobile computing device, such as a television, a smartphone, a tablet, a laptop computer, or a desktop computer. In one or more embodiments, the client device 130 executes a client application that uses an application programming interface (API) to communicate with the image processing platform 120 through the network 140.

The image capture device 110 and the client device 130 can communicate with the image processing platform 130 via a network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, 5G spectra, LTE-M), or satellites. The network 140 also may use networking protocols, such as TCP/IP, HTTP, SSH, SMS, or FTP, to transmit data between computing devices. In one or more embodiments, the network 140 may include Bluetooth or near-field communication (NFC) technologies or protocols for local communications between computing devices. The network 140 may transmit encrypted or unencrypted data.

Example Fisheye Lens Attachment

The image capture device 110 includes a lens attachment that is removably secured to a camera. In such embodiments, the image capture device 110 comprises a housing that secures the fisheye lens to the camera and secures it in place while the camera is used to collect image data. When secured to the camera, the lens attachment redirects lights from the camera lens through a fisheye lens with a wider field of view so that the camera of the mobile device captures image data across a wider field of view.

Figure 2:
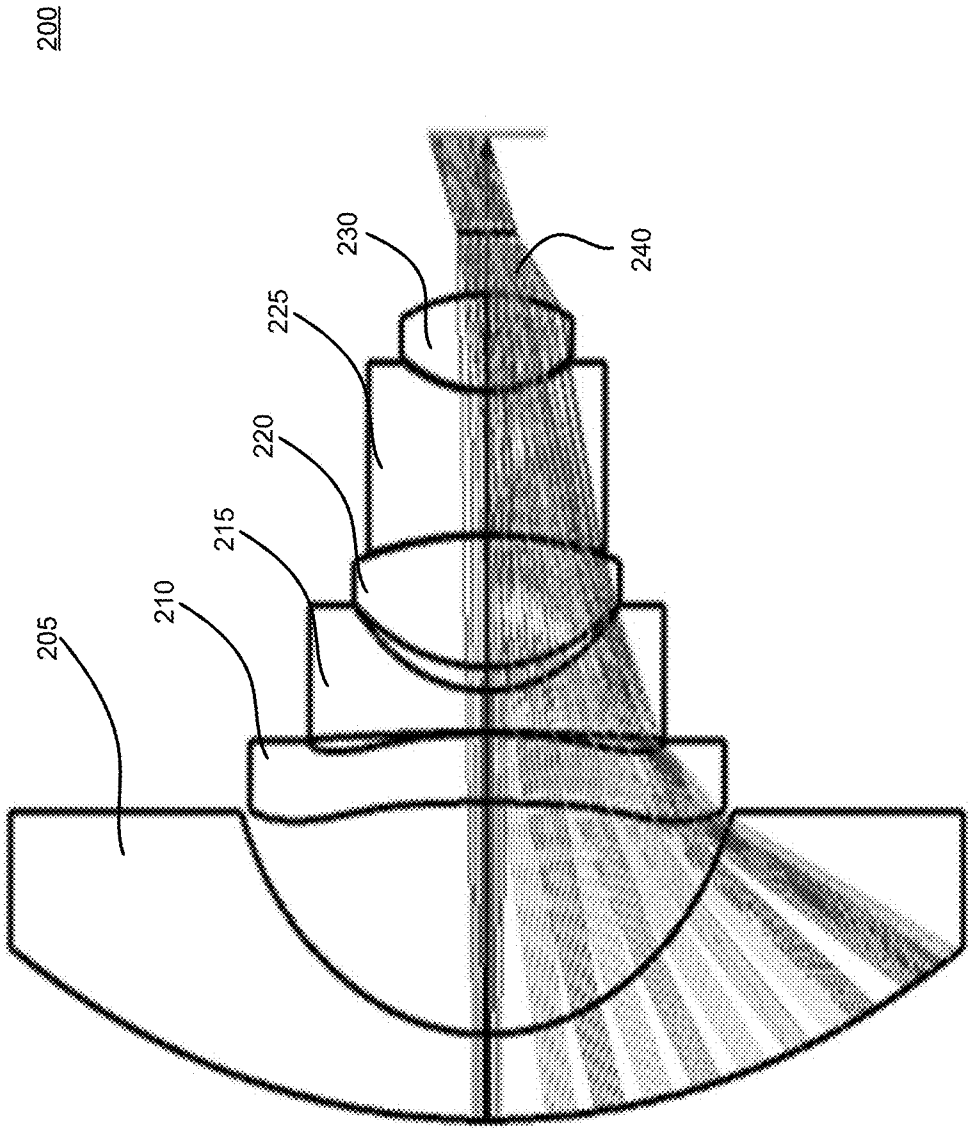
FIG. 2 illustrates a cross-section of the lens of the image capture device, according to one or more embodiments.

FIG. 2 illustrates a cross-section of the lens of the image capture device 110, according to one or more embodiments. Standard fisheye lenses have a wider field of view compared to traditional lenses but introduce distortions in the images they capture by stretching the distance between objects in the image data and warping the perceived depth of image data captured at the edges of the image frame. The configuration and optical properties of the lens assembly 200 improve the quality of image data at the edges of a frame by reducing distortions at the edges.

In the illustrated embodiment, the lens assembly 200 is comprised of six lens components 205, 210, 215, 220, 225, 230. The six lenses are secured within a housing 235. As is illustrated in FIG. 2, the optical properties of the lens components 205, 210, 215, 220, 225, and 230 direct incident light ray towards the center of the lens component 230 and the lens of the camera, which allows the lens assembly 200 to capture a wider field of view compared to traditional, pinhole camera lenses. As will be further described below, the shape of each element of the lens assembly 200 can be defined based on the shape of the surface, the radius of curvature of each surface, and the effective surface diameter of each surface. In some embodiments, each of the lens components 205, 210, 215, 220, 225, and 230 are designed out of optical glass, for example silicon dioxide. Types of optical glass are identified based on their glass code, which describes the substrate and the company who produces the substrate. As will be further described below, the properties of the optical glass may be characterized based on measurable properties of the substrate. Additionally, a person of ordinary skill in the art would appreciate that the measurements and ranges described herein can vary from ±0.1%, ±0.2%, ±0.3%, ±0.4%, ±0.5%, ±0.6%, ±0.7%, ±0.8%, ±0.9%, ±1%, 12%, ±3%, ±4%, ±5%, ±6%, ±7%, ±8%, ±9%, ±9.5%, 110%, or any other suitable variance.

Traditional fisheye lenses have lower pixels per degree field of view at the edges of a video frame compared to the center of the video frame, which causes the distortion and reduced image quality at the edges of the video frame. In contrast, the lens assembly 200 exhibits a distribution profile with a more even distribution of the pixels per degree field of view. The lens assembly 200 dedicates more pixels to the edge of the video frame and less pixels to the center of the video frame, which results in an increased sharpness at distances away from the center. As described herein, sharpness describes the clarity of detail in an image or video frame. In some embodiments, the lens assembly 200 increases pixel density at higher angular distances from the center of an image or video frame. For example, given a video frame capturing a soccer field, the lens assembly 200 maximizes the number of pixels between 30-35 degrees from the center of the video frame (e.g., the far corner of a soccer field) to maintain image quality for a person.

Figure 3A:
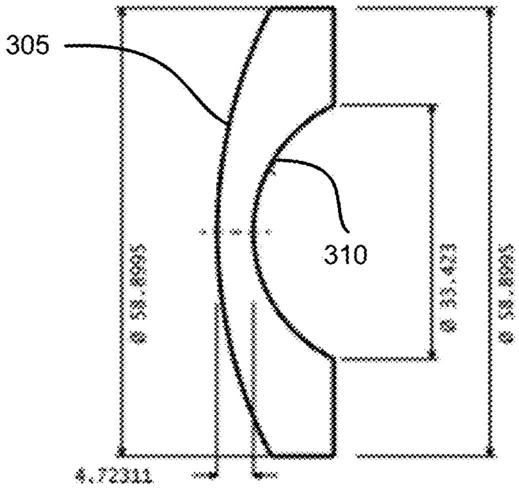
FIG. 3A-F illustrates a side view of the lens component, according to one or more embodiments.

FIG. 3A illustrates a side view of the lens component 205, according to one or more embodiments. The lens component 205 consists of a convex right surface 305 and a concave left surface 310. The radius of curvature (R) describes the curvature of the surfaces of the lens (e.g., how curved the lens is). The radius of curvature is determined based on the distance between the center of curvature (C) and the optical center of the lens. Radius of curvature measurements as described herein have tolerance measurements of ±3 fringes. In one embodiment, the right surface 305 of the lens component 205 has a radius of curvature of 64.7009 millimeters and the left surface 310 of the lens component 205 has a radius of curvature of 18.5026 millimeters. The effective diameter of a surface (Øe) is the diameter of the lens aperture through which light passes. The effective surface diameter represents the region of the lens that light passes through to form the final image. In one embodiment, the right surface 305 of the lens component 205 has an effective surface diameter of 58.8995 millimeters and the left surface 310 of the lens component 205 has an effective surface diameter of 33.423 millimeters.

The refractive index (ND) is a measure of how light bends when it passes through the material. The higher the refractive index of a material, the more strongly light will bend as it passes through the material. Refractive indices as described herein have tolerance measurements of ±0.0005 to 0.001. Abbe number (VD) is a measure of a material's dispersion. The Abbe number describes the degree to which different colors experience a different refractive index. The higher the Abbe number of a material, the larger the dispersion of the material. Abbe numbers as described herein have tolerance measurements of ±0.5% to 1%. In one embodiment, the lens component 205 has a refractive index of 1.696800. In one embodiment, the lens component 205 is designed using optical glass with an Abbe number of 55.53. In one embodiment, the lens component 205 is designed from a substrate with the glass code H-LAK51A.

Figure 3B:
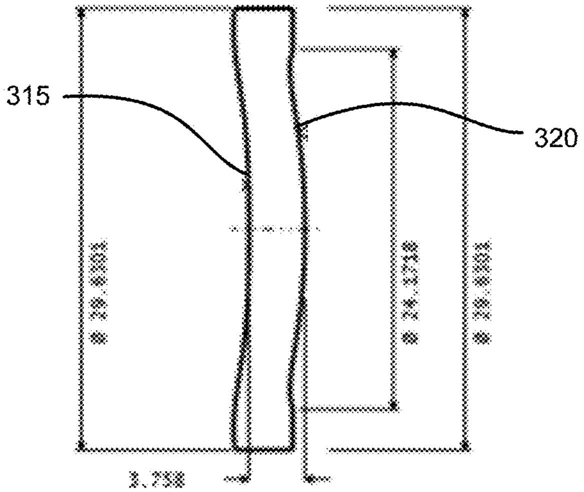

FIG. 3B illustrates a side view of the lens component 210, according to one or more embodiments. The lens 210 consists of a concave right surface 315 and a concave left surface 320. As illustrated in FIG. 3B, the lens component 210 is an aspherical lens where the profiles of the right surface 315 and the left surface 320 are not portions of a sphere. The surface profiles of aspherical lenses, such as the opt can reduce or eliminate optical aberrations. In one embodiment, the right surface 315 of the lens component 210 has a radius of curvature of 18.0554 millimeters and the left surface 320 of the lens component 210 has a radius of curvature of 13.2123 millimeters. In one embodiment, the right surface 315 of the lens component 210 has an effective surface diameter of 29.6301 millimeters and the left surface 320 of the lens component 210 has an effective surface diameter of 24.1718 millimeters. In one embodiment, the lens component 205 has a refractive index of 1.534611. In one embodiment, the lens component 205 is designed using optical glass with an Abbe number of 56.07. In one embodiment, the lens component 205 is designed from a substrate with the glass code ZEONEX_F52R_2016.

Figure 3C:
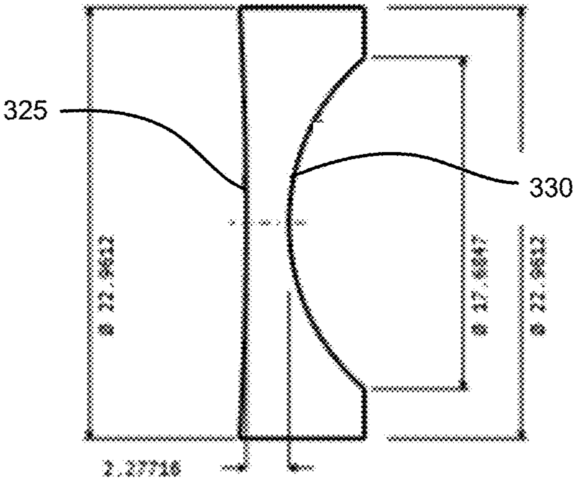

FIG. 3C illustrates a side view of the lens component 215, according to one or more embodiments. The lens component 215 consists of a concave right surface 325 and a concave left surface 330. In one embodiment, the right surface 325 of the lens component 215 has a radius of curvature of 191.431 millimeters and the left surface 330 of the lens component 215 has a radius of curvature of 11.725 millimeters. In one embodiment, the right surface 325 of the lens component 215 has an effective surface diameter of 22.9612 millimeters and the left surface 330 of the lens component 215 has an effective surface diameter of 17.6847 millimeters. In one embodiment, the lens component 205 has a refractive index of 1.754998. In one embodiment, the lens component 205 is designed using optical glass with an Abbe number of 52.34. In one embodiment, the lens component 205 is designed from a substrate with the glass ode H-LAK53B.

Figure 3D:
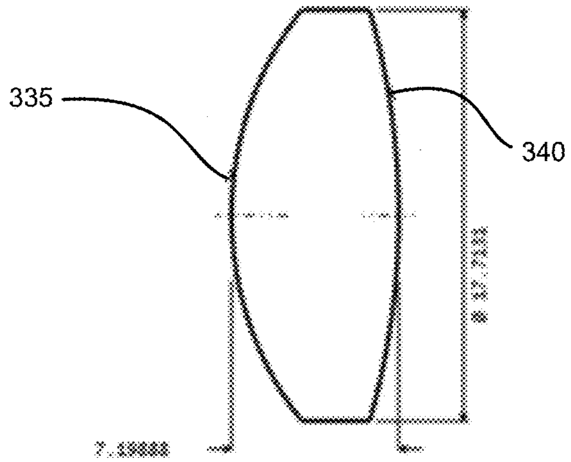

FIG. 3D illustrates a side view of the lens 220, according to one or more embodiments. The lens component 220 consists of a convex right surface 335 and a convex left surface 340. In one embodiment, the right surface 335 of the lens component 220 has a radius of curvature of 14.5015 millimeters and the left surface 340 of the lens component 220 has a radius of curvature of 31.8867 millimeters. In one embodiment, the right surface 335 of the lens component 220 has an effective surface diameter of 17.131 millimeters and the left surface 340 of the lens component 220 has an effective surface diameter of 17.7131 millimeters. In one embodiment, the lens component 205 has a refractive index of 1.761823. In one embodiment, the lens component 205 is designed using optical glass with an Abbe number of 26.61. In one embodiment, the lens component 205 is designed from a substrate with the glass ode H-ZF12.

Figure 3E:
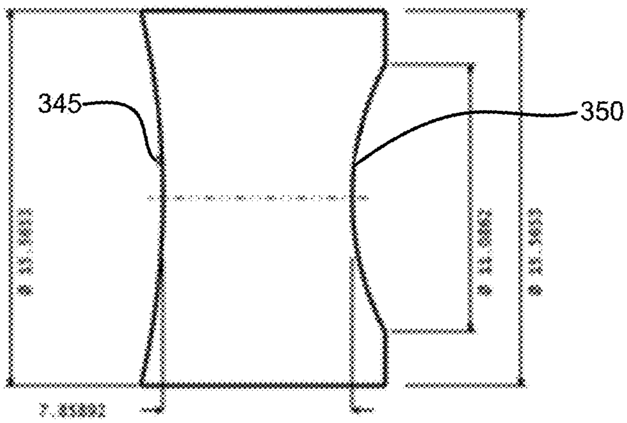

FIG. 3E illustrates a side view of the lens component 225, according to one or more embodiments. The lens component 225 consists of a concave right surface 345 and a concave left surface 350. In one embodiment, the right surface 345 of the lens component 225 has a radius of curvature of 33.165 millimeters and the left surface 350 of the lens component 220 has a radius of curvature of 11.9193 millimeters. In one embodiment, the right surface 345 of the lens component 225 has an effective surface diameter of 15.5653 millimeters and the left surface 350 of the lens component 225 has an effective surface diameter of 11.0862 millimeters. In one embodiment, the lens component 205 has a refractive index of 2.003307. In one embodiment, the lens component 205 is designed using optical glass with an Abbe number of 28.32. In one embodiment, the lens component 205 is designed from a substrate with the glass ode H-ZLAF92.

Figure 3F:
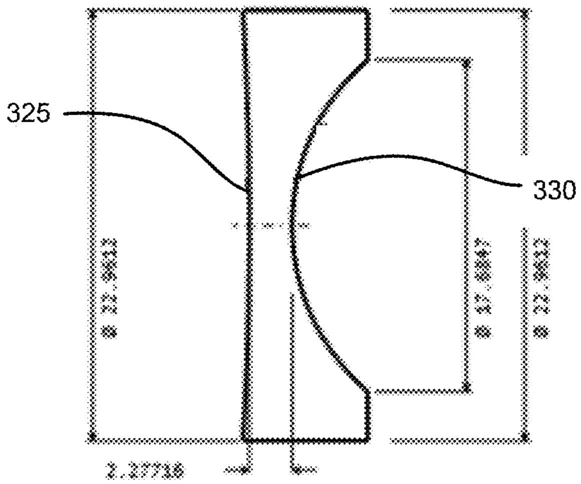

FIG. 3F illustrates a side view of the lens component 230, according to one or more embodiments. The lens component 230 consists of a convex right surface 355 and a convex left surface 360. In one embodiment, the right surface 355 of the lens component 230 has a radius of curvature of 10.8818 millimeters and the left surface 360 of the lens component 230 has a radius of curvature of 14.4267 millimeters. In one embodiment, the right surface 355 of the lens component 230 has an effective surface diameter of 11.1089 millimeters and the left surface 360 of the lens component 230 has an effective surface diameter of 11.1089 millimeters. In one embodiment, the lens component 205 has a refractive index of 1.613395. In one embodiment, the lens component 205 is designed using optical glass with an Abbe number of 44.17. In one embodiment, the lens component 205 is designed from a substrate with the glass ode H-TF3L.

Resampling a Fisheye Image as a Perspective Projection

As described above, a camera with a fisheye lens captures images with a wider field of view than a camera with a traditional pinhole lens. However, to capture the wider field of view, the fisheye lens stretches the distance between objects capture in an image or a video frame, which introduces visual distortions throughout the image. To remove such distortions, the image processing platform 120 projects regions of an image captured using a fisheye lens attachment into a two-dimensional representation resembling an image captured using a traditional pinhole lens.

For the sake of explanation, the reprojection techniques applied by the image processing platform 120 are described herein with reference to video frames (e.g., segments of video data) captured using a fisheye lens. However, a person of ordinary skill in the art, would appreciate that these reprojection techniques could also be applied to still images (e.g., image data). As described herein, video frames captured using a fisheye lens attachment are referred to as "fisheye frames." Frames generated by reprojecting the fisheye images into pinhole images are referred to as "perspective projections." Perspective projections are two-dimensional (2D) projections of a region of interest in a video frame captured using a fisheye lens. Described differently, the perspective projection is a representation of a region of the video frame as if the region had been captured in a video frame using a camera with a traditional pinhole lens. Accordingly, the image processing platform 120 may generate a modified video frame by mapping each pixel of the captured video frame to a coordinate space corresponding to the lens of the camera.

Returning to the example of a camera on a mobile device positioned at half-court of a basketball game, the pinhole camera on the mobile device would only capture a small portion of the court centered around half-court given the camera's limited field of view. If the ball were inbounded at half-court, the camera would capture the ball within its limited field of view. However, as the ball moved away from half-court and towards one of the basketball hoops, the ball would leave the camera's limited field of view. A user must manually adjust the orientation of the camera to keep the ball within its field of view. However, if the mobile device were coupled to a fisheye lens attachment, for example the lens assembly 200, the camera could capture video frames with a much wider field of view, for example the entire basketball court in a single frame. However, the perspective distortions in such fisheye images often make it difficult to view or follow particular objects across video frames.

As the basketball moves downcourt towards the basket, the image processing platform 130 following the basketball by continuously identifying a region of interest containing the basketball. The image processing platform 130 converts the region of interest from the distorted representation in the fisheye frame to a two-dimensional perspective projection resembling how the region of interest would have appeared if a camera with a pinhole lens had been rotated and adjusted to capture the region. The image processing platform 130 reprojects an identified region of interest (e.g., the region of the video frame where the basketball is located) as a perspective projection of the region of interest without the distortions of the initial fisheye frame.

Figure 4A:
FIG. 4A is an example video frame captured using a fisheye lens attachment, according to one or more embodiments.
Figure 4B:
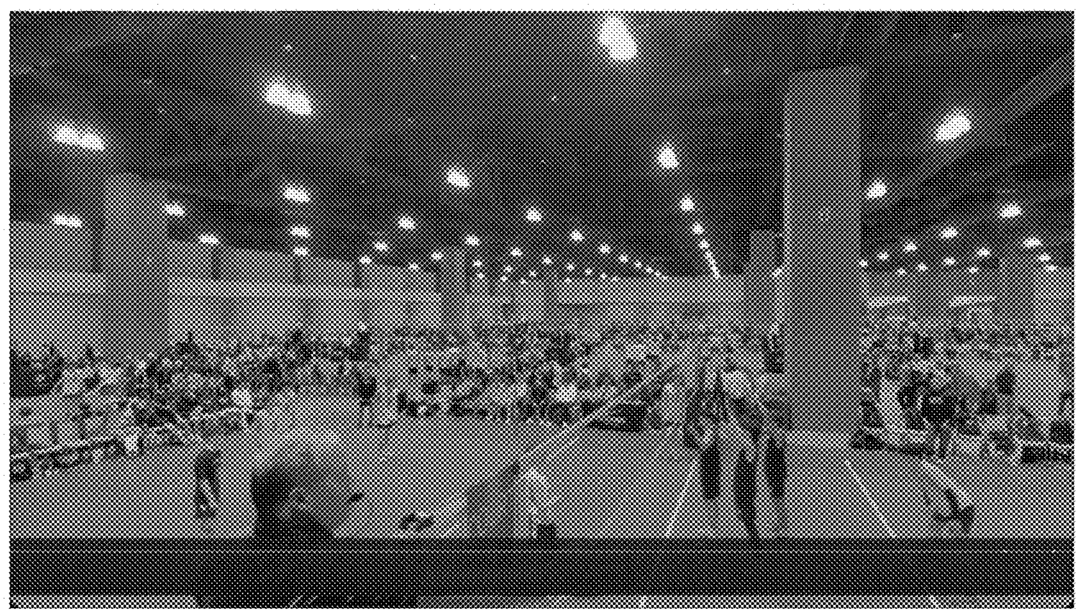
FIG. 4B is an example perspective projection of the region of interest captured in the video frame, according to one or more embodiments.

FIG. 4A is an example fisheye frame 400 captured using a fisheye lens attachment, according to one or more embodiments, according to one or more embodiments. The illustrated video frame captures a volleyball game. Given the wide field of view of the fisheye lens attachment, the video frame captures the entire court and the surrounding crowd of observers. As described above, the perspective distortions of the video frame can be observed throughout the video frame. The virtual camera 405 defines a region of interest within the video frame. As described herein, the virtual camera 405 defines the region within the fisheye frame that the image processing platform 120 will convert into a perspective projection. The region of interest defined by the virtual camera 405 captures the net, the volleyball, the player holding the volleyball, and the players surrounding the volleyball. FIG. 4B is an example perspective projection of the region of interest captured in the video frame, according to one or more embodiments. As illustrated in FIG. 4B, the perspective projection 450 is limited to the region of interest captured within the virtual camera 405. The perspective projection is a two-dimensional image capturing the region of interest within the virtual camera 405 without the distortions present in the initial video frame 200.

Figure 5:
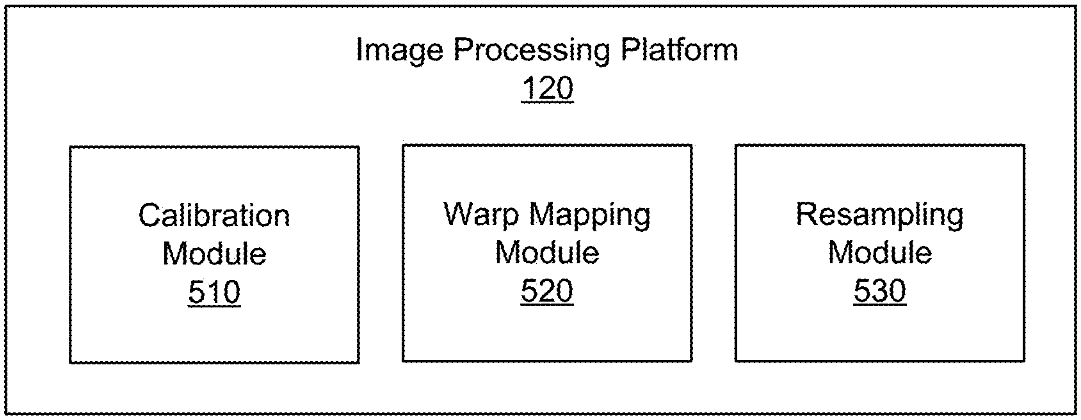
FIG. 5 illustrates an example system architecture for an image processing platform, in accordance with one or more embodiments.

FIG. 5 illustrates an example system architecture for an image processing platform 120, in accordance with one or more embodiments. The image processing platform 120 includes a calibration module 510, a warp mapping module 520, and a resampling module 530. Computer components such as web servers, network interfaces, security functions, load balancers, failover servers, management and network operations consoles, and the like are not shown so as to not obscure the details of the system architecture. Alternative embodiments may include more, fewer, or different components from those illustrated in FIG. 5, and the functionality of each component may be divided between the components differently from the description below.

To generate perspective projections from a distorted fisheye frame, the image processing platform 120 maps the position of each pixel in a distorted fisheye frame to an undistorted two-dimensional coordinate space. Prior to use of the image capture device 110, the calibration module 510 receives a distorted fisheye frame captured by the image capture device 110. The calibration module 510 maps each pixel of the distorted fisheye frame to a three-dimensional coordinate sphere. During use of the image capture device 110, the warp mapping module 520 receives a desired perspective projection. The desired perspective projection identifies a part of the scene captured in the fisheye frame to be projected as a two-dimensional frame without distortions. The warp calculation module 520 maps each pixel in the desired perspective projection from a two-dimensional coordinate plane to the three-dimensional coordinate sphere. Based on the calibration performed by the calibration module 510, the warp mapping module 520 further identifies the set of pixels in the captured fisheye frame corresponding to the mapped points in the coordinate sphere. The resampling module 530 reprojects the identified set of pixels in the captured fisheye frame in the coordinate plane of the perspective projection to generate an undistorted image of the field of view.

During calibration, the calibration module 510 maps each pixel on the distorted fisheye frame to a point on a three-dimensional coordinate sphere. As described herein, the coordinate sphere represents the entire range of motion available to a physical camera held by a user. For example, a user can rotate the camera up to 360 degrees across a horizontal axis in a coordinate space or rotate camera up to 360 degrees at various angles along a vertical axis in a coordinate space. The coordinate sphere captures all such possible rotations and adjustments. Accordingly, the center of the coordinate sphere represents a center of camera used to capture the fisheye frame and coordinate sphere represents the field of view of the fisheye lens attachment beyond the 180-degree field of view of a pinhole lens. After calibration, the resampling module 530 uses the coordinate sphere to identify pixels in a fisheye frame corresponding to the desired points in a perspective projection. In some embodiments, the mapping from points on a distorted fisheye frame to points on a three-dimensional coordinate sphere varies across different combinations of cameras and lenses, so the calibration module 510 may calibrate a particular camera and lens combination prior to each use.

The calibration model 510 identifies a pixel in the distorted fisheye frame at the coordinates (u, v) on the two-dimensional fisheye frame and pixel to a corresponding three-dimensional point (x, y, z) on the coordinate sphere. As described above, the calibration module 510 models distortions in the two-dimensional fisheye frame as a function of radial distance (e.g., the distance between a pixel of the fisheye frame and the center of the fisheye frame). In one embodiment, the calibration module 510 identifies the exact coordinate location in the coordinate sphere corresponding to a pixel in the fisheye frame. In such embodiments, the calibration module 510 maintains a multi-dimensional lookup table identifying the three-dimensional point in the coordinate sphere corresponding to each two-dimensional pixel in the fisheye frame.

In another embodiment, the calibration module 510 identifies the three-dimensional point in the coordinate sphere corresponding to the pixel in the fisheye frame based on the radial distance of the pixel in the fisheye frame. In such embodiments, the calibration module 510 models each fisheye frame as having a single focal length with distortions in the radial direction. The distortion merely extends the position of the pixel farther from the center of the fisheye frame or draws the position of the pixel closer to the center of the fisheye frame compared to the corresponding pixel in the perspective projection. However, the distortion does not affect the relative coordinate of the pixel itself. The location of the x-coordinate relative to the y-coordinate (also described as the ratio of the x-coordinate to the y-coordinate) of the pixel in the fisheye frame is the same as the relative location of the corresponding pixel in the perspective projection. Accordingly, the warp factor, which adjusts for distortion between the coordinate sphere and the fisheye frame can be modeled as a function of radial distance.

Additionally, as described above, the center of the coordinate sphere represents both the center of the camera used to capture the fisheye frame and the center of the fisheye frame itself. Accordingly, the calibration model 510 models radial distance in the coordinate sphere as a z-coordinate of the sphere. In one embodiment, the calibration model 510 models radial distance in the coordinate sphere as an arc length on the sphere. The arc length on the sphere is a three-dimensional analog of the two-dimensional radial distance in the fisheye frame. Accordingly, the calibration module 510 maps a normalized radial distance in the image to an angle θ in the coordinate sphere by projecting an arc distance of the coordinate sphere onto a two-dimensional plane.

During calibration, the calibration module 510 generates a one-dimensional lookup table of warp factors organized based on z-coordinates. As described herein, this one-dimensional look-up table is referred to as a "mapping lookup table." As will be described further below, the warp mapping module 520 identifies a pixel position in the fisheye frame corresponding to a point in the coordinate sphere based on the z-coordinate of the point in the coordinate sphere and the warp factor stored in the mapping lookup table. The z-coordinate of a given point on the coordinate sphere is determined as a trigonometric function (e.g., a cosine function) of the angle θ of the arc distance projected onto the coordinate sphere. In one embodiment, the calibration module 510 determines the angle θ by applying the inverse function (e.g., arccosine function) and determines the normalized radial distance as a function of the angle θ. To determine the radial distance of the image. The calibration module 510 determines the warp factor for each coordinate on the coordinate sphere based on the radial distance of the image and the normalized radial distance. The calibration module 510 stores each z-coordinate with the corresponding warp factor in the mapping lookup table. When generating a perspective projection, the warp mapping module 520 applies the warp factor (e.g., multiplies) to scale the x-coordinate and the y-coordinate of the point on the coordinate sphere such that the scaled x-coordinate an y-coordinate represent the pixel position in the fisheye frame corresponding to the point in the coordinate sphere.

The number of pixels in the fisheye frame ranges from 0 to the dimensions of the frame itself. The coordinate (u, v) represents the position of a pixel on the fisheye frame. As described herein, normalization refers to the scaling of pixels of the fisheye frame to coordinates on the coordinate sphere. Computationally, the calibration module 510 maps a distorted point in the fisheye frame to an undistorted point on the coordinate sphere according to Equations (1) through (7) where (u, v) represents a point on the fisheye frame, (x, y, z) represents a point non the coordinate sphere, K is an intrinsic calibration function parameter, and $f_u$ is an undistortion function mapping:

$$u_{normalized} = (u - K_u)/K_f \quad (1)$$

$$v_{normalized} = (v - K_v)/K_f \quad (2)$$

$$r_{normalized} = \sqrt{\left(u_{normalized}{}^2 + v_{normalized}{}^2\right)} \quad (3)$$

$$\theta = f_U(r_{normalized}) \quad (4)$$

$$x = \sin(\theta) * u_{normalized}/r_{normalized} \quad (5)$$

$$y = \sin(\theta) * v_{normalized}/r_{normalized}, \quad (6)$$

$$z = \cos(\theta) \quad (7)$$

In equations (1) to (3), the calibration module 510 normalizes the coordinates (u,v) of the pixels on the fisheye frame and the radial distance of the lens onto the coordinate sphere. Ku and Kv are the coordinates of a center of the fisheye frame and Kf is the focal length (which represents a pixel scaling). For example, the coordinate observed from the same viewing angle in a frame captured at 4k resolution has a larger center coordinate and focal length as the coordinate observed from the same viewing angle in a frame captured in 1080p. In equations (4) to (7), the calibration module 510 maps the normalized coordinates from the fisheye frame to three-dimensional point on the coordinate sphere.

The warp mapping module 520 mimics the physical movement of a camera with a pinhole lens (e.g., panning, tilting, and zooming) by identifying a region of interest within the fisheye frame corresponding to the physical movement of the camera. The warp mapping module 520 maps points in a perspective projection to points on the three-dimensional coordinate sphere and then maps the points on the coordinate sphere to pixel positions on a captured fisheye frame. As described herein, this process is referred to as "inverse mapping." In inverse mapping, the fisheye frame captured by the image capture device 110 may also be referred to as "an input image." The perspective projection generated by the generated after resampling pixels of the input image is referred to as the "output image." In the inverse mapping technique described herein, the warp mapping module 520 identifies an output image (e.g., a desired perspective projection) from an input control signal and maps points of the output image backwards to identify corresponding pixel positions in an input image (e.g., a captured fisheye frame).

Figure 6:
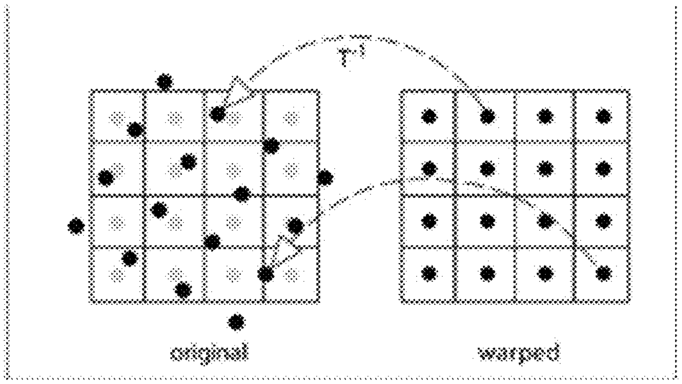
FIG. 6 illustrates an inverse mapping of pixels from an output fame to pixels of a source frame, in accordance with one or more embodiments.

FIG. 6 illustrates an inverse mapping of pixels from an output frame to pixels of a source frame, in accordance with one or more embodiments. In the illustrated embodiment, the "warped" set of pixels refer to pixels on perspective projection and the "original" set of pixels refer to pixels in the originally captured fisheye frame. As illustrated in FIG. 6, the pixels in the original fisheye frame are rotated at an angle to reflect the distortions of the fisheye frame. In comparison, the pixels in the plane projection are oriented in two-dimensions as if they had been captured through a traditional pinhole lens. The warp mapping module 520 applies a transform function to determine pixel positions on the fisheye frame where in the source frame the resampling module 530 should sample pixels from to generate the desired output frame (e.g., the desired perspective plane). As a result, the warp mapping module 520 applies the techniques described below to identify pixel positions in the illustrated output image corresponding to pixel positions in the original source image.

Returning to FIG. 5, the field of view of a camera can be characterized using four control inputs: pan, tilt, roll, and zoom. Accordingly, the warp mapping module 520 receives an input signal identifying one or more of the following controls: pan, tilt, roll, and zoom. Because the controls characterize a field of view, the control input signal pans the virtual camera 405 to different regions of the captured fisheye frame. The control signal further describes a desired perspective projection that would have been captured by a camera subject to the controls in the input signal.

The coordinate sphere models the entire range of motion available to a manually controlled pinhole lens camera. The coordinate sphere includes a set of points corresponding to any rotation of the camera 0 to 360 degrees across a horizontal axis. Similarly, the coordinate sphere includes a set of points corresponding to the rotation of the camera at any angle across a vertical axis. Accordingly, the warp mapping module 520 maps the controls of the input signal to one or more three-dimensional points on the calibrated coordinate sphere.

The warp mapping module 520 further identifies one or more points on the fisheye frame corresponding to the three-dimensional points on the coordinate sphere based on the mapping generated during calibration, for example the one-dimensional mapping lookup table described above with reference to the calibration module 510. In one embodiment, the warp mapping module 520 applies a series of transform operations to the pixel positions in the desired perspective projection to identify a corresponding set of pixel positions in the initial fisheye frame. The warp mapping module 520 maps each pixel in the perspective projection to pixel positions in the fisheye frame to identify where the resampling module 530 should sample pixel data to generate the desired perspective projection.

The warp mapping module 520 may update the perspective projection as it receives updated control input signals. For example, as a basketball moves down court, the warp mapping module 520 may receive updated control input signals that adjust the field of view of the perspective projection to track the movement of the basketball. In some embodiments, the image processing platform 120 applies computer vision techniques, deep learning techniques, other suitable models or algorithms, or a combination thereof to an image or series of video frames to identify the region of the image to be captured in a perspective projection. The image processing platform 120 generates updated control input signals or adjustments to existing control input signals based on the identified region of the frame.

Returning to FIG. 5, the resampling module 530 extracts pixel data from the pixels at positions in the fisheye frame mapped by warp mapping module 520. In one embodiment, the resampling module 530 interpolates a set of neighboring pixels for each mapped point in the fisheye frame to determine an average pixel value for the mapped position. The resampling module 530 projects the average pixel value to the corresponding pixel position on the perspective projection. In one embodiment, the resampling module 530 applies bilinear or bicubic interpolation, where the resampling module 530 determines an average pixel value for a position by interpolating neighboring pixels in a rectilinear grid surrounding each mapped position in the fisheye frame.

By performing this process for each pixel of the perspective projection, the resampling module 530 generates a video frame of the perspective projection, which is displayed to a user.

Figure 7:
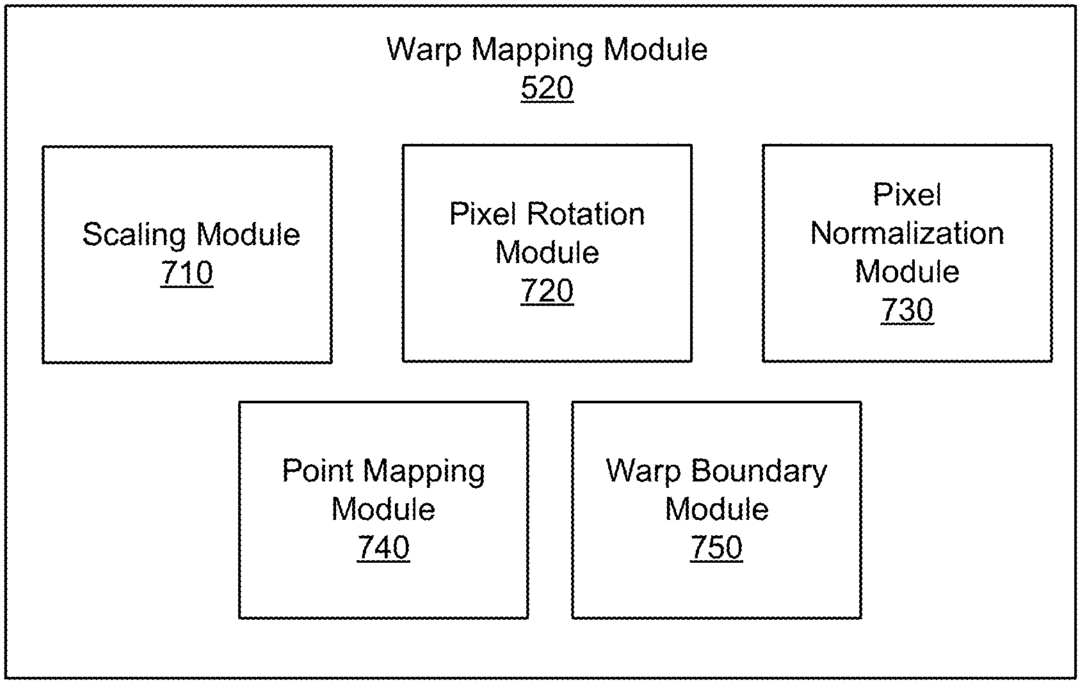
FIG. 7 illustrates an example system architecture of the warp mapping module, in accordance with one or more embodiments.

FIG. 7 illustrates an example system architecture of the warp mapping module 520, in accordance with one or more embodiments. The warp mapping module 520 includes a scaling module 710, a rotation module 720, and point normalization module 730, a warp boundary module 740, and a point mapping module 750. Computer components such as web servers, network interfaces, security functions, load balancers, failover servers, management and network operations consoles, and the like are not shown so as to not obscure the details of the system architecture. Alternative embodiments may include more, fewer, or different components from those illustrated in FIG. 7, and the functionality of each component may be divided between the components differently from the description below.

Figure 8A:
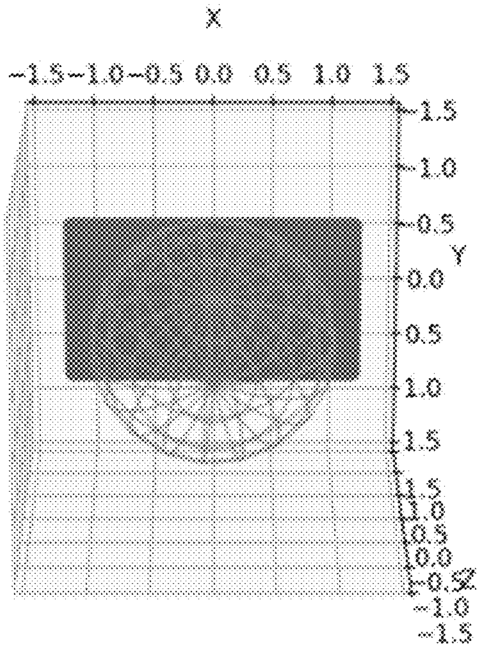
FIGS. 8A-B illustrate a two-dimensional coordinate plane of a perspective projection relative to a three-dimensional coordinate sphere, in accordance with one or more embodiments.

During inverse mapping, the warp mapping module 520 models a maximum allowable field of view of a two-dimensional perspective projection in the coordinate plane z=1. FIG. 8A illustrates a two-dimensional coordinate plane 800 for a perspective projection relative to a three-dimensional coordinate sphere, in accordance with one or more embodiments. In the illustrated embodiment, the coordinate plane 800 is projected in the plane z=1. The warp mapping module 520 calculates the position of each pixel of the desired perspective projection in the projected coordinate plane (x, y, 1). For example, the warp mapping module 520 may determine the position of the three-dimensional pixel (x, y, z) in the coordinate plane of the perspective projection as (x/z, y/z, 1).

As described above, the field of view of a camera with a pinhole lens can be modeled using four control signals: pan, tilt, roll, and zoom. The scaling module 710 scales each point in the projected coordinate plane according to the zoom control signal. In one embodiment, the scaling module 710 directly applies the zoom signal by multiplying the x-coordinate and y-coordinate of each point in the projected coordinate plane by a scale factor s. Depending on the value of the scale factor s, the zoom signal may either shrink or expand the coordinate plane corresponding to the perspective projection.

Figure 8B:
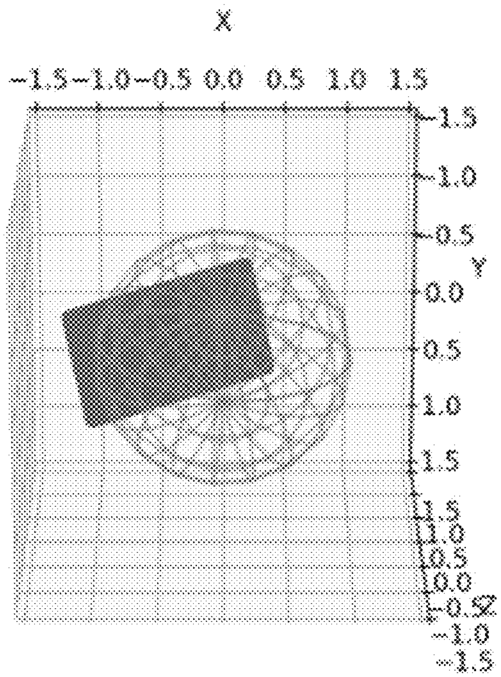

The rotation module 720 combines the pan, tilt, and roll control signals into a single rotation control signal (R). In some embodiments, the control signal (R) is a linear transformation that rotates the coordinate plane of perspective projection from being tangent to one point on the coordinate sphere to being tangent to another. In one embodiment, the rotation module 720 models the rotation of the sphere as a combined rotation matrix in order for $R_{pan}*R_{tilt}*R_{roll}$. FIG. 8B illustrates a rotation and a scaling of the two-dimensional coordinate plane 850 relative to a three-dimensional coordinate sphere, in accordance with one or more embodiments. As illustrated in FIG. 8B, the coordinate plane 850 is positioned tangent to a first point within the coordinate sphere before being rotated to be tangent to another point in the coordinate sphere.

The point normalization module 730 applies a non-linear transformation to map each pixel position of the scaled and rotated perspective projection to a point on the coordinate sphere. In one embodiment, the point normalization module 730 determines a normalization factor of each point after applying the scale factor s. For example, the scaled normalization factor ($N_f$) may be computed according to Equation (8):

$$N_f = 1/\sqrt{(1+s^2x^2+s^2y^2)} \tag{8}$$

Given the normalization factor $N_f$ the point normalization module 730 maps each pixel position (x, y, 1) of the scaled perspective projection from its position (x, y, 1) in the two-dimensional coordinate plane to a three-dimensional point on the coordinate sphere ($s*x*N_f$, $s*y*N_f$ $N_f$).

In some embodiments, the point normalization module 730 models the scaled normalization factor as a function of the scale factor and the radial distance of the pixel position on the perspective projection (e.g., the distance from the pixel to the center of the perspective projection). In such embodiments, the point normalization module organizes scaled normalization factors into a one-dimensional normalization lookup table where each entry in the normalization lookup table maps a "scaled input" (s) to a pre-computed scaled normalization factor. The scaled input s, is determined as a function of the position (x, y) of a pixel on the coordinate plane of the perspective projection and the radial distance for the pixel on the perspective projection. Accordingly, the scaled normalization factor may be pre-computed and organized in the normalization lookup table according to Equations (9) to (11):

$$N_f = 1/\sqrt{(1+s_i^2)} \tag{9}$$

$$s_i = s^2 * r^2 \tag{10}$$

$$r^2 = x^2 + y^2 \tag{11}$$

Based on the determined normalization factor, the point normalization module 730, the point normalization module 730 maps each pixel position (x, y, 1) of the scaled perspective projection from its position (x, y, 1) in the two-dimensional coordinate plane to a three-dimensional point on the coordinate sphere ($s*x*N_f$, $s*y*N_f$ $N_f$).

The point mapping module 740 maps points normalized on the coordinate sphere by the point normalization module 730 to points on the fisheye frame (e.g., the source image). The normalized points on the coordinate sphere are three-dimensional (x, y, z) coordinates. Accordingly, the point mapping module 740 maps the normalized three-dimensional points on the coordinate sphere to distorted two-dimensional points on the source fisheye frame. As described above with reference to the calibration module 510, the warp mapping module 520 models the distortion based on the radial distance, which is modeled by the z-coordinate of point on the coordinate sphere. The point mapping module 740 accesses the mapping lookup table generated during calibration. For each normalized point on the coordinate sphere, the point mapping module 740 searches the mapping lookup table for the warp factor determined for the z-coordinate of the point. The point mapping module 740 determines the (u, v) coordinate of the corresponding point in the fisheye frame by applying the warping factor to scale each of the x-coordinate and y-coordinate of the normalized point in the coordinate sphere. The point mapping module 740 stores the scaled x-coordinate and y-coordinate are the coordinates of the corresponding point in the fisheye frame. In some embodiments, the point mapping module 740 additionally includes image offsets to the scaled coordinates.

Figure 9A:
FIG. 9A illustrates a perspective projection 900 near the edge of a fisheye frame, according to one or more embodiments.

In FIG. 4A, the virtual camera 405 identified a region of the fisheye frame 400 to be displayed in the perspective projection. The warp boundary module 750 monitors and governs the movement of the virtual camera 405 in response to a set of control signals. As described above, a physical camera may rotate 360 degrees in every direction. However, the fisheye frame does not wrap around 360 degrees in every direction. As a result, the unrestricted movement of the virtual camera 405 may cause the point mapping module 740 to sample from pixels that contain no image data. FIG. 9A illustrates a perspective projection 900 near the edge of a fisheye frame, according to one or more embodiments. The pixels in the area 905 are beyond the fisheye frame and, therefore, do not contain image data to be projecting by the resampling module 530. As a result, the perspective projection 900 includes the blacked-out portion of the projection 330, which negatively impacts the viewing experience of a user. Accordingly, the warp boundary module 750 implements boundary box that constrains the movement of the virtual camera 405 to regions including pixels with pixel data. In one embodiment, the warp boundary module 750 generates a boundary box based on the boundary of the source fisheye frame. In such embodiments, the warp boundary module 750 determines whether a set of control input signals would result in the resampling module 530 sampling of pixels beyond the boundary of the fisheye frame. The warp boundary module 750 further determines how to adjust the control input signals so that the resampling module 530 samples on pixels within the boundary of the fisheye frame.

Figure 9B:
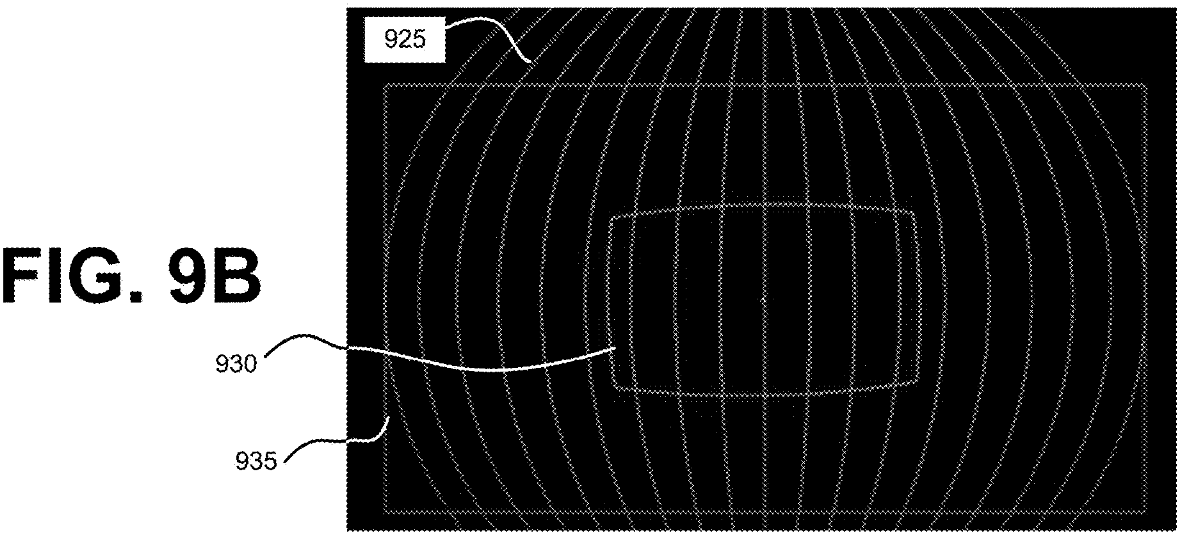
FIG. 9B illustrates a representation of the fisheye lens 925 with a virtual camera 930 moving within a boundary box 935, according to one or more embodiments.
Figure 9C:
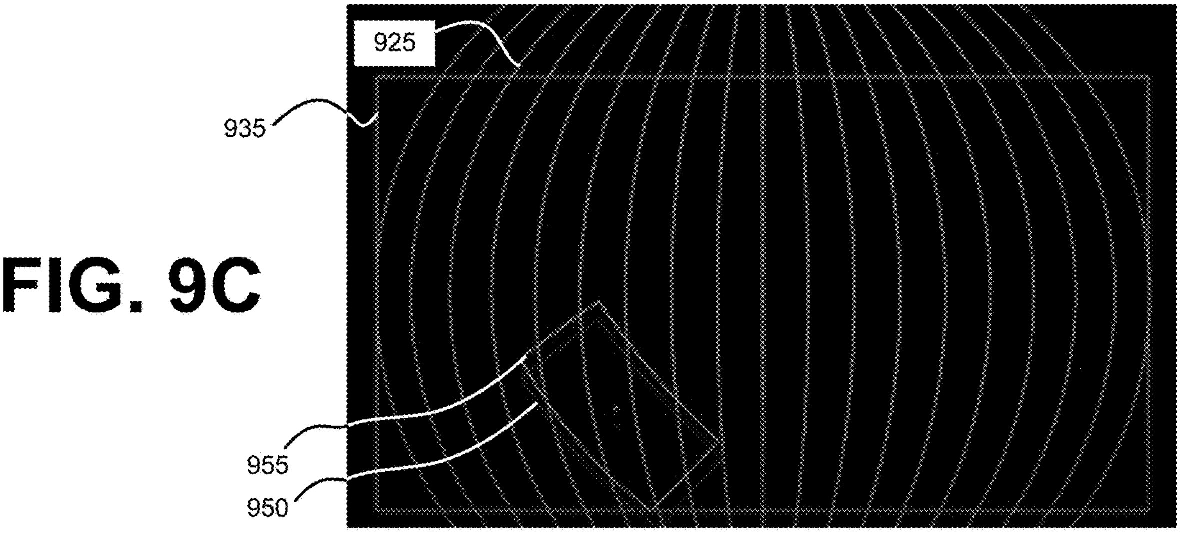
FIG. 9C illustrates a representative of the fisheye lens 925 with a virtual camera 950 moving beyond the boundary box 935, according to one or more embodiments.

FIG. 9B illustrates a representation of the fisheye lens 925 with a virtual camera 930 moving within a boundary box 935, according to one or more embodiments. The virtual camera 930 moves within the boundary box 935 as it responds to control input signals. In the illustrated embodiment of FIG. 9B, the virtual camera 930 is entirely located within the boundary box 925. As long as the virtual camera moves within the boundary box 930, the resampling module 530 projects image data onto the perspective projection within the virtual camera 930. In contrast, FIG. 9C illustrates a representative of the fisheye lens 925 with a virtual camera 950 moving beyond the boundary box 935, according to one or more embodiments. In the illustrated embodiment of FIG. 9C, the virtual camera 950 is partially located outside the boundary box 950 (e.g., the bottom left corner of the virtual camera frame). Rather than generating a perspective projection that is partially obscured in the manner illustrated in FIG. 9A, the warp boundary module 750 redefines the virtual camera 950 as the modified virtual camera 955. As illustrated in FIG. 9C, the modified virtual camera 955 is entirely located within the boundary box 935.

The warp boundary module 750 evaluates each control input (e.g., pitch, roll, tilt) to determine whether the control input is within an allowable range for the corresponding input. If the warp boundary module 750 determines that a given control input will exceed an allowable range given a boundary box around the fisheye frame while holding the other control inputs constant, the warp boundary module 750 updates the control input to a range within the boundary box. The warp boundary module 750 iteratively performs this approach given each control input signal until each control input signal is within the allowable range given the boundary box.

Figure 10:
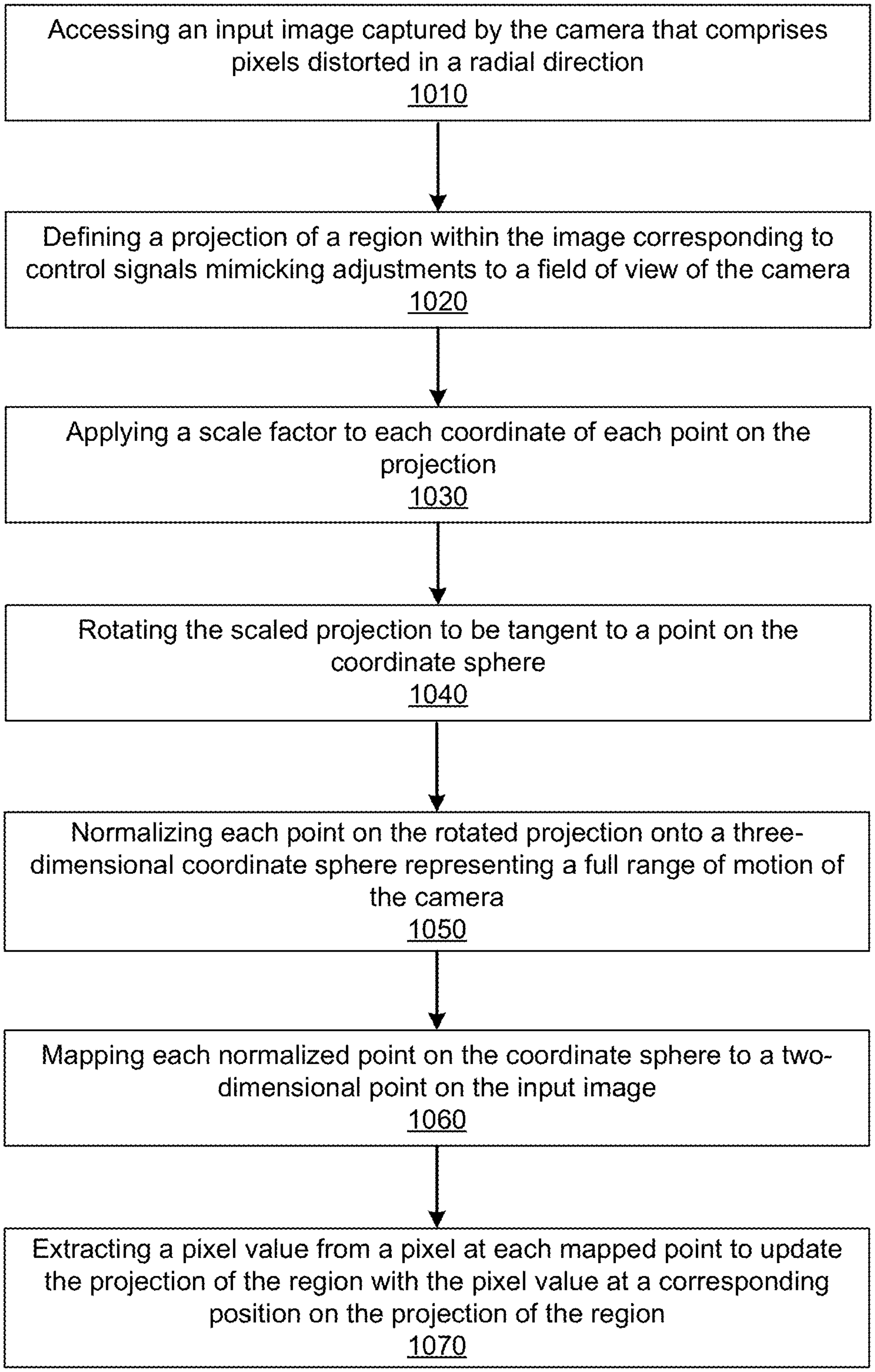
FIG. 10 is a flowchart illustrating a process for populating a projection of a region within an image using mapped pixel values, according to one or more embodiments.

FIG. 10 is a flowchart illustrating a process for populating a projection of a region within an image using mapped pixel values, according to one or more embodiments. The image capture device 110 accesses 1010 an input image captured by a camera that comprises pixels distorted in a radial direction. The image capture device 110 defines 1020 a projection of a region within the image corresponding to control signals mimicking adjustments to a field of view of the camera. The projection is a two-dimensional coordinate plane of the region without distortions in the radial direction. The image capture device 110 applies 1030 a scale factor to the coordinates of each point on the projection and rotates 1040 the scaled projection according to the control signals.

The image capture device 110 normalizes 1050 each point on the projection onto a three-dimensional coordinate sphere representing a full range of motion of the camera. The image capture device 110 maps 1060 each normalized point on the coordinate sphere to a two-dimensional point on the input image. For each mapped point on the input image, the image capture device extracts 1070 a pixel value from a pixel at the mapped point and projects the pixel value at a corresponding position on the projection of the region.

Other Considerations

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising one or more computer-readable media containing computer program code or instructions, which can be executed by a computer processor for performing any or all of the steps, operations, or processes described. In one or more embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed:

1. A method comprising:

accessing an input image captured by a camera, wherein the image comprises pixels distorted in a radial direction;

defining a projection of a region within the image corresponding to a set of control signals mimicking adjustments to a field of view of the camera, wherein the projection is a two-dimensional coordinate plane of the region without distortions in the radial direction;

normalizing each point on the projection onto a three-dimensional coordinate sphere, wherein the coordinate sphere represents a full range of motion of the camera;

mapping each normalized point on the coordinate sphere to a two-dimensional point on the input image by identifying, for each pixel position in the projection, a warp factor based on a z-coordinate of the pixel position in the projection and modifying an x-coordinate and y-coordinate of the pixel position in the projection using the identified warp factor, wherein the two-dimensional point on the input image mapped to the normalized point on the coordinate sphere is determined based on and after identifying the modified x-coordinate and modified y-coordinate of the pixel position in the projection; and for each mapped point on the input image, extracting a pixel value from a pixel at the mapped point to project the pixel value at a corresponding position on the projection of the region.

2. The method of claim 1, further comprising:

applying a scale factor to each coordinate of each point on the projection; and applying a linear transform to rotate the projection to be tangent to a point on the coordinate sphere.

3. The method of claim 1, wherein normalizing each point on the projection onto a three-dimensional coordinate sphere comprises:

determining a normalization factor for each point on the projection based on the position of each point on the projection and a radial distance of each point on the projection; and applying a normalization factor to each coordinate of each point on the projection to map each point on the projection to a point on the three-dimensional coordinate sphere.

4. The method of claim 1, wherein extracting image data from the pixel at the mapped point comprises:

interpolating a plurality of neighboring pixels to determine an average pixel value for the mapped point on the input image.

5. The method of claim 1, further comprising:

monitoring the field of view corresponding to the projection within a boundary box, wherein the boundary box defines points on the input image with non-zero pixel values; and responsive to determining the field of view exceeds the boundary box, modifying the field of view to remain within the boundary box.

6. The method of claim 1, further comprising:

mapping the position of each pixel on the input image to a point on the three-dimensional coordinate sphere, wherein distortion of the pixel is modeled in a z-coordinate of the point on the three-dimensional coordinate sphere.

7. A non-transitory computer readable medium comprising stored program code, the program code comprising instructions that when executed by one or more processors cause the one or more processors to:

access an input image captured by a camera, wherein the image is a two-dimensional image comprising pixels distorted in a radial direction;

define a projection a region within the image corresponding to a set of control signals mimicking adjustments to a field of view of the camera, wherein the projection is a two-dimensional coordinate plane of the region without distortions in the radial direction;

normalize each point on the projection onto a three-dimensional coordinate sphere, wherein the coordinate sphere represents a full range of motion of the camera;

map each normalized point on the coordinate sphere to a two-dimensional point on the input image by identifying, for each pixel position in the projection, a warp factor based on a z-coordinate of the pixel position in the projection and modifying an x-coordinate and y-coordinate of the pixel position in the projection using the identified warp factor, wherein the two-dimensional point on the input image mapped to the normalized point on the coordinate sphere is determined based on and after identifying the modified x-coordinate and modified y-coordinate of the pixel position in the projection; and for each mapped point on the input image, extract a pixel value from a pixel at the mapped point to project the pixel value at a corresponding position on the projection of the region.

8. The non-transitory computer readable medium of claim 7, further comprising instructions that cause the one or more processors to:

apply a scale factor to each coordinate of each point on the projection; and apply a linear transform to rotate the projection to be tangent to a point on the coordinate sphere.

9. The non-transitory computer readable medium of claim 7, wherein the instructions for normalizing each point on the projection onto a three-dimensional coordinate sphere further cause the processor to:

determine a normalization factor for each point on the projection based on the position of each point on the projection and a radial distance of each point on the projection; and apply a normalization factor to each coordinate of each point on the projection to map each point on the projection to a point on the three-dimensional coordinate sphere.

10. The non-transitory computer readable medium of claim 7, wherein the instructions for extracting image data from the pixel at the mapped point further cause the one or more processors to:

interpolate a plurality of neighboring pixels to determine an average pixel value for the mapped point on the input image.

11. The non-transitory computer readable medium of claim 7, further comprising instructions that cause the one or more processors to:

monitor the field of view corresponding to the projection within a boundary box, wherein the boundary box defines points on the input image with non-zero pixel values; and responsive to determining the field of view exceeds the boundary box, modify the field of view to remain within the boundary box.

12. The non-transitory computer readable medium of claim 7, further comprising instructions that cause the one or more processors to:

mapping the position of each pixel on the input image to a point on the three-dimensional coordinate sphere, wherein distortion of the pixel is modeled in a z-coordinate of the point on the three-dimensional coordinate sphere.

13. A system comprising:

one or more processors; and a non-transitory computer readable medium comprising stored program code, the program code comprising instructions that when executed by one or more processors cause the one or more processors to:

access an input image captured by a camera, wherein the image is a two-dimensional image comprising pixels distorted in a radial direction;

define a projection a region within the image corresponding to a set of control signals mimicking adjustments to a field of view of the camera, wherein the projection is a two-dimensional coordinate plane of the region without distortions in the radial direction;

normalize each point on the projection onto a three-dimensional coordinate sphere, wherein the coordinate sphere represents a full range of motion of the camera;

map each normalized point on the coordinate sphere to a two-dimensional point on the input image by identifying, for each pixel position in the projection, a warp factor based on a z-coordinate of the pixel position in the projection and modifying an x-coordinate and y-coordinate of the pixel position in the projection using the identified warp factor, wherein the two-dimensional point on the input image mapped to the normalized point on the coordinate sphere is determined based on and after identifying the modified x-coordinate and modified y-coordinate of the pixel position in the projection; and for each mapped point on the input image, extract a pixel value from a pixel at the mapped point to project the pixel value at a corresponding position on the projection of the region.

14. The system of claim 13, further comprising instructions that cause the one or more processors to:

apply a scale factor to each coordinate of each point on the projection; and apply a linear transform to rotate the projection to be tangent to a point on the coordinate sphere.

15. The system of claim 13, wherein the instructions for normalizing each point on the projection onto a three-dimensional coordinate sphere further cause the processor to:

determine a normalization factor for each point on the projection based on the position of each point on the projection and a radial distance of each point on the projection; and apply a normalization factor to each coordinate of each point on the projection to map each point on the projection to a point on the three-dimensional coordinate sphere.

16. The system of claim 13, wherein the instructions for extracting image data from the pixel at the mapped point further cause the one or more processors to:

interpolate a plurality of neighboring pixels to determine an average pixel value for the mapped point on the input image.

17. The system of claim 13, further comprising instructions that cause the one or more processors to:

monitor the field of view corresponding to the projection within a boundary box, wherein the boundary box defines points on the input image with non-zero pixel values; and responsive to determining the field of view exceeds the boundary box, modify the field of view to remain within the boundary box.

18. The system of claim 13, further comprising instructions that cause the one or more processors to:

mapping the position of each pixel on the input image to a point on the three-dimensional coordinate sphere, wherein distortion of the pixel is modeled in a z-coordinate of the point on the three-dimensional coordinate sphere.

* * * * *